United States Patent

[11] 3,621,177

[72] Inventors Neil Freeman McPherson
Oakville;
Nils Hanssmann, Ancaster, both of Canada
[21] Appl. No. 782,370
[22] Filed Dec. 9, 1968
[45] Patented Nov. 16, 1971
[73] Assignee Atomic Energy of Canada Limited
Ottawa, Ontario, Canada

[54] METHOD AND APPARATUS FOR TIG TUBE WELDING
13 Claims, 23 Drawing Figs.

[52] U.S. Cl. ................................................. 219/61, 219/137
[51] Int. Cl. ............................................. B23k 31/06
[50] Field of Search ..................................... 219/60, 60.1, 61, 125, 137

[56] References Cited
UNITED STATES PATENTS
| | | | |
|---|---|---|---|
| 2,747,065 | 5/1956 | Diehl ............................ | 219/61 X |
| 2,817,745 | 12/1957 | Pilia et al. ...................... | 219/67 |
| 3,230,344 | 1/1966 | Glatthorn et al. ............. | 219/137 |

Primary Examiner—D. F. Duggan

ABSTRACT: Described herein is a method and apparatus for fully automatically weld-joining lengths of metal instrument tubing employing the TIG welding process to advance a weld puddle about the periphery of the junction of aligned ends of straight tubing, respective end portions of which are held in a closed chamber rigidly clamped in spaced seats of a robust metal head to resist elongation by heating; the unit comprises a handle portion axially separably joined with the head and providing drive to a rotating electrode carrier spool therein about the work, angular interval marking signals being transmitted to a remote control unit from which welding current and gas is supplied to the head according to a weld program selected for the material being joined. A welding cycle commences with a stationary arc developing a weld pool, followed by advance at uniform speed of the arc with controlled current levels over sectors, the arc being sustained beyond 360° and the complete cycle spanning two revolutions of the carrier and terminating with a bead-cooling gas flow. Repeatable welds of high quality on a production basis may be obtained, characterized by minimal fall-in of bead, full area fusion of faces, and constant internal diameter.

INVENTORS
NEIL FREEMAN McPHERSON
NILS HANSSMANN by R.J. Filipkowski
patent agent

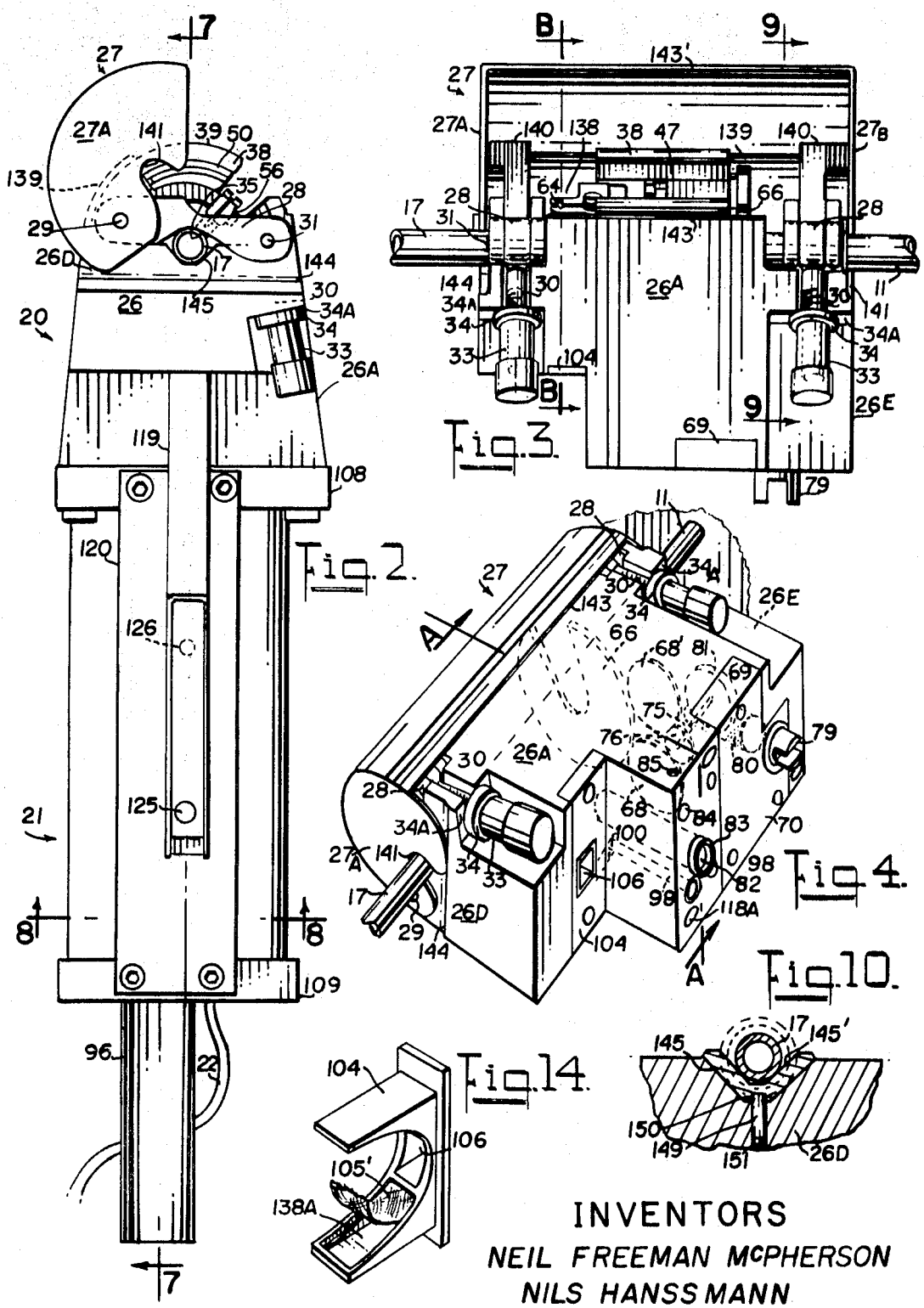

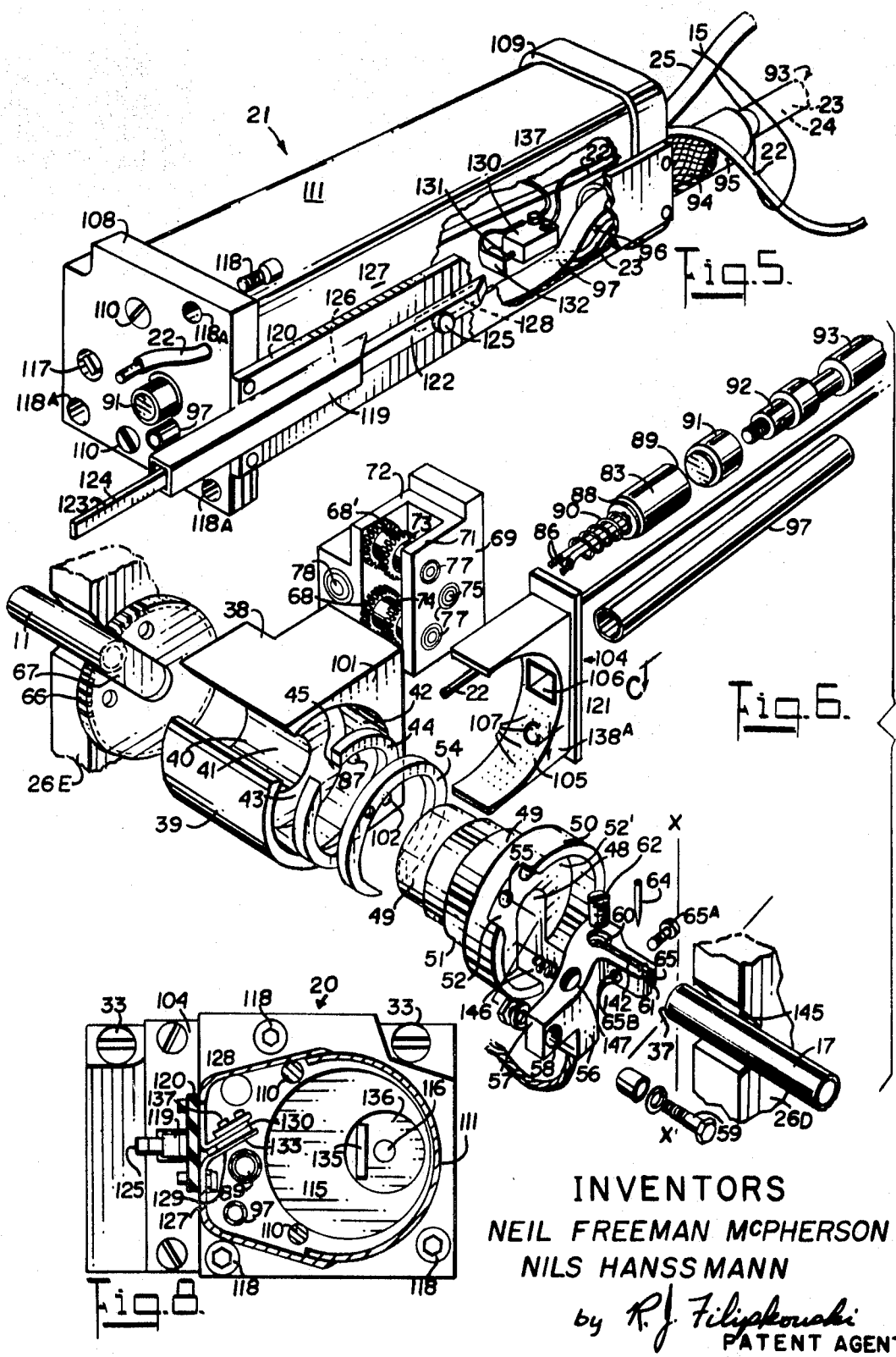

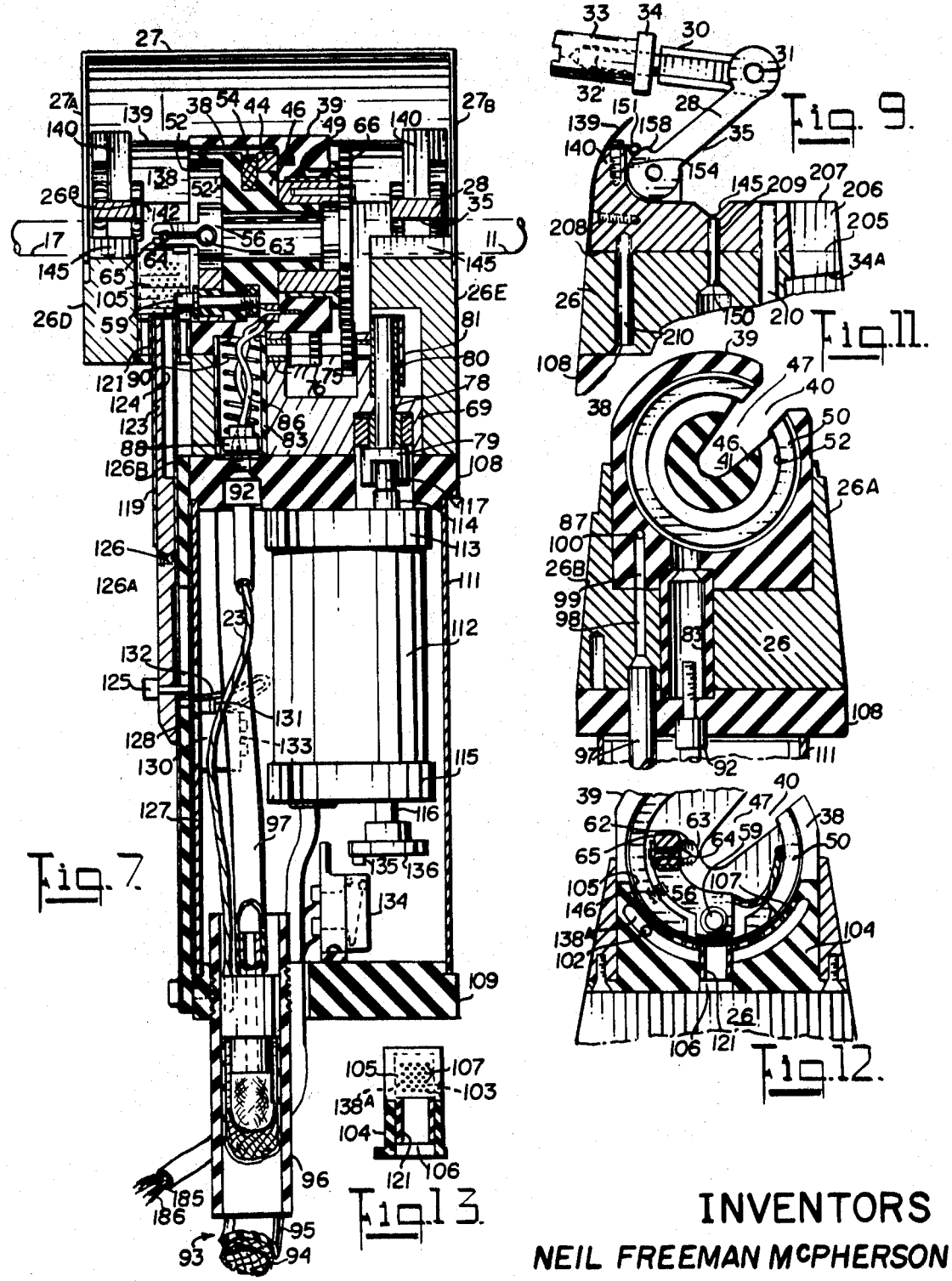

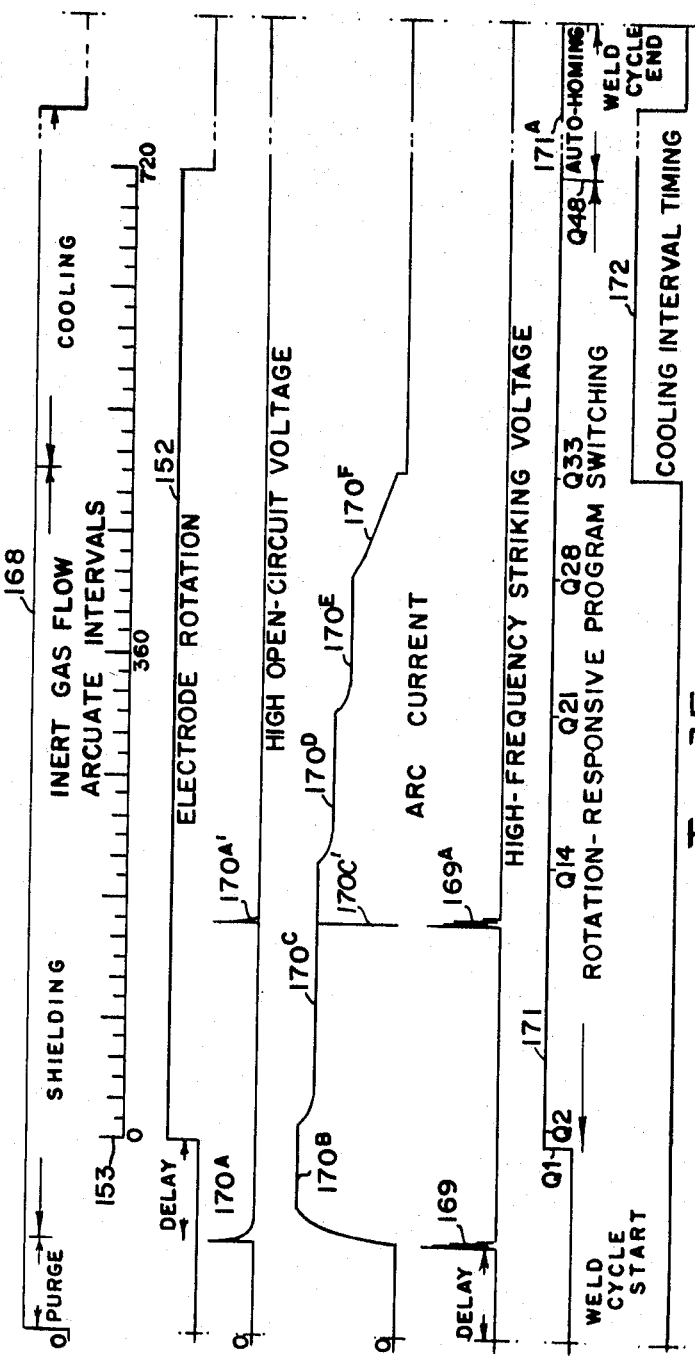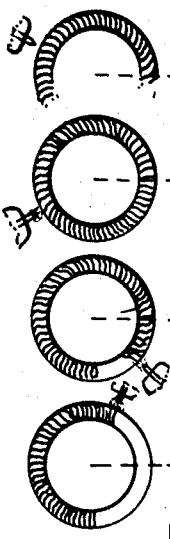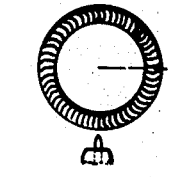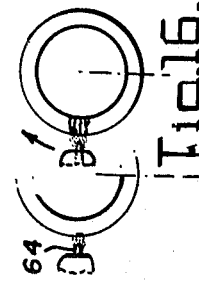

Fig.22

INVENTORS
NEIL FREEMAN MCPHERSON
NILS HANSSMANN by R.J. Filipkowski
PATENT AGENT

METHOD AND APPARATUS FOR TIG TUBE WELDING

This invention relates to weld-joining of metal tubing, and more particularly concerns a novel method and apparatus for automatic fusion joining of abutting lengths of tubing by means of an electric arc using a nonconsumable refractory electrode in an inert atmosphere.

The invention is especially but not exclusively directed to solving the problem of providing a completely automatic welding system in which a miniature, hand-sized welding unit is clamped about lengths of instrument tubing such as is used in process industries and nuclear power reactor monitoring, with the ends held in abutting relation, requiring the operator only to set a program of welding parameters at the controls of associated supply apparatus and to press a start button to initiate a program-controlled joint-welding sequence. By the use of the unit a reliable welded joint of the highest quality may be produced, with minimal dimensional changes at the weld bead, i.e. internal and external diameters, without the necessity of prior special end preparations such as upsetting or flanging of the tubing ends.

By the novel method of the present invention the abutting tubing ends are integrally joined while being held under strong axial compression resulting from heating of the clamped column due to the action of an electric arc produced between the work and a refractory electrode, which is rotatable about the axis of the stationary tubing. The program set into the supply apparatus controls the welding current to effect rapid initial preheating while the electrode is held stationary, to develop a gastight compression seal between the tube ends, followed by electrode rotation through more than one revolution with precisely controlled decreasing amperage values of welding current to achieve the most favorable size and state of the weld puddle and to effect a weld which is smooth both on the interior and exterior surfaces of the tubing.

Whenever the production of large numbers of welded joints in tubing is required and extremely stringent specifications for weld quality are set, as in the welding of sensing and control tubing lines extending from a reactor, equipment available hitherto has failed to perform acceptably under the physical conditions pertaining to construction sites. In these and many other industrial locations, such conditions as constricted working space shared by other trades, difficulty of access to individual tubing ends, the presence of mixed sizes of tubing at one location, and rigid metallurgical specifications for weld ductility, strength, uniformity of dimensions and freedom from leaks, have disqualified virtually all known apparatus of the prior art.

The present invention stems from a recognition that acceptable equipment performance criteria for a miniature portable and versatile welding unit demand the features of handling facility, working reliability, and assured weld quality with constant and minimal dimensional changes of tubing diameter in the weld zone. An automatic welding unit therefore has been envisaged, embodying the following preferred features:

a. the size and weight of the unit must preferably be minimal, permitting its support by an end of tubing clamped in one seat, of a diameter for example as small as ¼ inch projecting as little as 1½ inches from a panel pierced by adjacent tubing ends spaced as closely as 2 inches on centers;

b. the unit must preferably be capable of joining concentric tubing having planar end faces without resort to special end preparations requiring machining or forming;

c. the unit must preferably be capable of being used interchangeably with tubing of various wall thicknesses ranging in size from about ¼ inch or smaller to about 1 inch diameter or more with minimum mechanical adjustment and with no electrical adjustment at the unit, other than selection of appropriate control settings at a remote supply apparatus;

d. the unit must preferably align and hold the tube ends precisely concentrically and axially aligned with each other;

e. the unit must preferably be rigid enough to restrain axial expansion of tubing due to heating of the column extending between clamps in seats disposed in opposite end walls of the unit, to assure development of maximum axial compression and joint seal;

f. the positioning of the end of the supporting tubing must preferably be reliably effected by the operator solely by "feel" without elaborate gauging or any need for visual corroboration that the plane of the end is in the weld plane, by provision of a limit stop for self-locating of the tubing end when inserted "blind" into one side of the housing;

g. the rotating electrode tip must preferably be precisely spaced from the joint surface for all tubing sizes by employing a sliding follower riding on the tubing surface near the weld;

h. a completely encloseable weld chamber must preferably be provided in which the atmosphere is as free as possible of any eddying or turbulence, and free of contaminants, through the entire welding and cooling operations, provisions being made for initial flushing of the weld chamber, and a continuing inflow of inert gas at a velocity and in a manner such as to have no disturbing effect on the arc;

i. the program of controlled arc current must preferably be correlated to predetermined peripheral intervals of the joint and must maintain optimum weld zone heating rates within each interval to prevent wrinkling or sagging and to maintain constant dimensions of internal and external tube diameters following the welding in the plane of the joint;

j. electrode displacement signals should be provided for synchronizing program follower apparatus independently of electrode angular velocity, and regardless of tube size;

k. the system must preferably provide for internal tube purging with inert gas throughout both the welding and cooling phases at a pressure sufficient to assist in maintaining tube dimensions in the weld zone without adversely affecting the arc, to prevent contamination and oxidation.

In addition to the foregoing, the unit should be robust and easy to maintain operative, and have a low first cost.

The concept of a versatile hand-sized tool for carrying out the novel method and which embodies the practical features enumerated above has been found feasible, by the creation of a welding head which according to one aspect of the invention is in the form of a one-piece hollow metal housing having opposed end walls formed with tube-clamping seats accommodating insertable adapters for holding tubing of a range of diameters concentric with the rotational axis of the electrode, in conjunction with a separable handle extension providing a drive input to the head electrode, shielding gas input, welding current input, and means for signalling synchronizing information based on increments of electrode displacement rather than on angular position. The unit is preferably served by a remote power supply and program selector apparatus having controls for adjusting weld current valves throughout the automatic cycle for each combination of tubing diameter, wall thickness, and metal or alloy material, the homologous current steps of each program spanning identical angular displacement intervals of the electrode about the tubing periphery. Consequently by providing motor drive to the welding head from the separable handle unit, and by generating signals in the handle representative of the motor drive speed and synchronizing signals representative of increments of angular displacement of the electrode, accurate speed control and weld current program may be achieved remotely of the head regardless of its location and the size and kind of tubing being welded.

The welding head embodying the foregoing features is therefore of simplified form, and may, in accordance with a further aspect of the invention comprise a minimum of components, namely, a rigid hollow housing of metal such as aluminum alloy, enclosing a weld chamber provided with a hinged cover to retain inert gas atmosphere, the end walls being rigid and formed with aligned seats of ample bearing area fitted with releasable clamps for holding lengths of abutting tubing coaxial with an electrode carrier in the form of a revoluble spool rotating in a fixed insulated bearing block provided with bearings, and carrying stationary contacts engaging contacts carried by the electrode spool, to lead current to a refractory electrode held in the electrode support arm and spaced from the work by a follower guide; a transmission inside the housing imparts rotation to the spool. The inputs to the head, namely gas conduit, welding current, conductors, and transmission drive shaft, are readily and quickly coupled by plug-in connection to assemble the head and its handle portion.

The associated handle, which according to a further aspect of the invention is preferably arranged to project from the head proper in a direction at right angles to the axis of tubing clamped in the housing seats, also carries a minimum of mechanical and electrical elements, namely a miniature motor, an input transmission, a speed-sensing element, an incremental displacement responsive switching means, and electrical and gas conduit elements. In addition, a slidable rod is mounted to be accessible to the operator and having one end projectable beyond the end of the handle member into an aperture in the housing to enter the weld chamber, the accurate mounting of the weld head on a length of tubing being performed by feel, using the side of the rod as a limit stop to align the open tube end in the weld plane. The assembly of a welding head with the handle portion realizes a light, strong, compact and versatile welding unit according to the invention which may be mounted on a projecting length of tubing as short as the distance from the exterior end face of the head to the tip of the electrode.

An operator, when provided with a single housing, and a corresponding range of insertable seats for the housing or when provided with a range of welding heads for use interchangeably with one handle unit, may readily join tubing of a range of sizes at one location.

According to one form of the invention, a complete portable system for carrying out the novel method of joining cylindric tubing and embodying the concepts and principles outlined above, comprises three separate apparatus units interconnected by flexible cables, namely, a lightweight hand-sized welding unit carrying tube-clamping, electrode rotation signalling, shielding, and drive components; a separate operator's indicator/control box providing visual monitoring devices and welding cycle stop-start controls; and a power supply unit housing the programming and control subsystems, and data recording equipment if required for weld evaluation.

The function of the welding unit in carrying out the novel method of tube joining is to hold and align the tube ends in the weld plane, restraining axial expansion and thereby subjecting the abutting end faces to rapidly increasing compressive axially directed pressure resulting from an initial preheating weld current raising the temperature of the restrained tubing column many hundreds of degrees, the arc developing a weld puddle of minimum fluidity and areal extent which is then advanced uniformly about the periphery of the joint, fusing the metal with minimum cratering, sagging, or bead widening. In certain welding modes the maintaining of uniform diameter at the weld zone is assisted by a controlled increased internal pressure of inert gas, depending on the early development of a good joint seal.

The operator's indicator box provides an ammeter and lamp for visual inspection as a weld cycle progresses, and essential pushbutton control elements for cycle start, interruption, and actuation of electrode drive as when effecting adjustment or repair.

The power supplies and programmed control apparatus subsystems, being considerably larger than the welding unit, are usually located at some distance from the work, providing the high-frequency ionizing voltage, the main welding current, the program-controlled displacement responsive adjustments of weld current and shielding gas flow, the electrode drive speed control, ancillary time delays, interlocks, and certain associated functions independent of electrode displacement such as weld chamber purging controls and arc failure sensing and arc maintaining systems. In addition a supply of inert gas with ancillary pressure selection and control means is preferably provided to flush the tubing in preparation for welding, and to maintain an inert gas atmosphere at predetermined pressure throughout the welding and cooling periods within the tubing.

In order that the problem of effecting satisfactory tubing welds with a maximum specified change of 5 percent in radial dimension internally and externally may be appreciated more realistically, the welding of 0.375-inch OD stainless steel tubing, type 304L with a wall thickness of 0.049 inch will be considered as an example, both by use of prior art techniques, and by use of the novel method according to the present invention. The requirement to be met will be assumed to be the consistent reproducibility of welds in which the bead both internally and externally is smooth, of uniform axial breadth, showing no end crater or oxidation, and being neither convex nor concave regardless of the position of the welding head during the welding operation. It will be further assumed that the minimum strength of the weld is to be 50,000 p.s.i., with complete fusion bonding exhibited throughout the thickness of the wall.

The following general discussion is presented to help in understanding the particular difficulties of meeting the foregoing objectives in welding thin-walled tubing. When the ends of two pieces of identical cylindric tubing are simply butted, with well-fitting planar end faces held in alignment, and the TIG process using argon, for example, is put into operation by initiating an electric arc between a refractory electrode tip and the work in the plane of the joint, a molten pool of metal will be produced spanning the inevitable joint gap separating the opposed tubing ends, promoting localized fusion bonding. When the pool is sufficiently hot so that the metal adjacent the end faces readily coalesces by surface tension phenomena into a fused mass, an inevitable result at this temperature is a chordal flattening of the pool surface, i.e. in the peripheral direction, and a slight sagging across the pool in the axial direction. As the arc is advanced and the trailing edge of the weld pool freezes, the shrinkage effect continuously displaces the hot metal rearwardly and inwardly, which in this example is the chief cause of radial constriction of the bead. The cooling weld bead therefore forms a ring body of which both the internal and external diameters are reduced as compared with the adjacent tubing diameters, by from 12 to 20 percent. In smaller tubing sizes, for example ¼ inch or even less, the physical dimensions of the pool span a greater portion of the periphery, and especially with heavier wall thicknesses the deformation of the bead is even more pronounced.

One prior art technique which has been adopted for welding a joint between tubing ends of larger diameters and greater wall thicknesses, particularly pipes, is the bevelling of the exterior edge of each tubing so that when the ends are opposed coaxially with each other a peripheral groove is provided, centered on the joint, and the welding operation consists in laying a bead to fill the groove, using a filler wire or metal powder, whereby a minimum internal diameter reduction is achieved. This technique is virtually impracticable with the example tubing or any tubing in the range of sizes contemplated herein.

Other prior workers have sought to provide a welding tool for joining small tubing by the TIG process to achieve nearly constant internal bead diameter, by resorting to radial flaring or flanging of the tube ends as an initial preparation step, the deformation being as much as 1.5 times the wall thickness, whereby the radial sagging of the bead formed by fusing the abutting flanges is allowed to shrink the weld zone diameter internally to be nearly identical with the rest of the tubing. Such methods not only add the cost of the additional forming step, but produce welded joints in which the bead has a high profile. Moreover, due to the higher fluidity of the weld puddle necessitated for attaining complete fusion in the weld root, gravity distortions are more severe. For example, if the tube is horizontal when being welded the internal cross section will be nonuniform.

It has long been recognized that a direct current arc led between a pointed radial electrode and the cylindric surface of tubing, tends to be easily disturbed by small variations in magnetic field, slight surface layer inhomogeneity, and out of roundness of the work; however the arc is even more susceptible to flutter in the gaseous atmosphere surrounding it has even the slightest motion, whether due to input flow of shielding gas, convention on heating, or issue of internal purge gas.

In carrying out the method according to the present invention, it is only necessary that when the tubing is cut the end faces are clean, burr-free, and lie in planes normal to the axis of the tube length without taper of flare, care being taken to avoid external surface scratches, bending or radial deformation. Straight lengths of round tubing having well-squared end faces may be accurately coaxially aligned by the weld head with minimum separation along any part of the joint periphery, favoring rapid early closing of the joint gap development of compressive stress in the tubing sufficient to effect complete closing, as will next be described.

The use of internal purge gas in the method of the present invention to provide a nonoxidizing, noncontaminating atmosphere, involves maintaining a slight pressure above atmosphere within the line of tubing, for example under a head of from 1 to about 3 inches of water column. Any issue of gas through the gap between areas of the end faces due to axial misalignment, nonsquareness, or edge nicks, will deflect the arc from side to side preventing concentration of heat at the junction and failing to achieve fusion bonding. Such issue of gas may even blow out the arc.

When the aligned tubing ends have been strongly clamped in respective end walls of the head in a manner to restrain endwise displacement due to expansion on heating, and the arc is initiated, the electrode is first fed with a constant direct current which may be greater than the weld current supplied throughout the remainder of the cycle. In a few seconds' time rapid preheating is effected while the electrode is held stationary, the quantity of heat input being sufficient to expand the tubing column between the clamps — if it were not restrained — as much as 0.015 inches or more. A weld puddle is quickly formed on the surface of the joint, sealing the underlying gap. If the arc should be blown out at any time it is at once reignited by the action of a response circuit which applies high open-circuit voltage and invention striking voltage. Once the weld puddle is established the arc is protected from further issue of gas toward the electrode, the puddle advancing with the rotation of the electrode. The sealing effect is aided by the development of strong and increasing compressive force between the end faces due to the restraining action of the housing end walls, which, with well-prepared tubing ends, achieves gastight sealing usually by the time less than one-third of the joint periphery has been welded.

In the absence of high axial loading in the tube walls ahead of the puddle, the greater part of the expansion of the highly heated metal would possibly be taken up in axial and peripheral displacement, but under the high compressive loading induced in the walls of the restrained tubing column a significant part of the expansion is thought to result in radial bulging. The small "hill" thus produced continuously immediately ahead of the weld puddle is quickly melted down on the side coming under the arc, having a beneficial effect in lifting the puddle surface slightly outwardly, and thus counteracting the forces which tend to cause sagging. Length measurements between marks inscribed on the tubing surfaces spaced on opposite sides of the joint, made before welding began and again after the joint has cooled and the tubing removed from the head, show a consistent length reduction. This decrease in axial length measured across the weld has been observed to be a few thousandths of an inch over a total length of 3 inches.

Under the conditions of high compressive loading induced in the clamped tubing column, some evidence is found to support the hypothesis that fusion bonding across the joint gap is achieved at a less fluid condition of the weld puddle. This is borne out by the observation that weld after weld carried out using an empirically determined program of weld currents for a given diameter of tubing and wall thickness achieves insignificant fall-in of the bead, i.e., negligible diameter reduction, whereas TIG welding with prior art apparatus of the same tubing requires higher heat input and yields an unsatisfactory bead.

The development of strong axial compressive stress in the restrained column of tubing, and the achievement of early effective gastight sealing of the gap, makes possible the use of controlled internal gas pressure even in the early portions of the weld cycle to assist in preventing radial fall-in of the weld puddle. At lower weld puddle fluidities such control is improved, as higher internal pressures may be used without causing convex welds. Moreover, in repair work where a fixed volume of line with sealed ends traps an internal gas filling, warming of the line contents and rise of internal pressure as the weld progresses has no harmful effect on the arc or resulting bead when the joint becomes tightly closed.

The invention may be more fully comprehended by a study of the following description of its embodiments in apparatus for effecting the novel method of welding tubing, in conjunction with the accompanying figures of the drawing, wherein:

FIG. 1 is an overall perspective view depicting the interrelated parts of a welding system according to the invention;

FIG. 2. is a left side elevation view of the welding unit showing the weld chamber cover in its opened position; FIG. 3 is a plan view of the welding head of FIG. 2 which is shown separated from the handle portion;

FIG. 4 is a perspective view of the welding head with the cover closed showing operating parts in phantom outline relation;

FIG. 5 is a perspective view of the separated handle;

FIG. 6 is a perspective view of the principal components of the welding head shown in disassembled relative layout relation, wherein the electrode support element is turned 90° anticlockwise relative to the spool for clarity;

FIG. 7 is a view partly in cross section taken along line 7—7 of the assembled unit of FIG. 2, the sectioning plane being shifted left below the handle to include the axis of the supply cable;

FIG. 8 is a transverse section taken on line 8—8 of FIG. 2 showing a portion of the electrode displacement responsive signalling switch, the section appearing in a position rotated 90° anticlockwise;

FIG. 9 is a partial transverse section taken on line 9—9 of FIG. 3 showing the cover removed and one clamping arm released, the section being rotated 90° anticlockwise;

FIG. 10 is a detail section of an alternative clamp seat similar to the view of FIG. 9, showing a separable insert;

FIG. 11 is a partial transverse section taken in plane designated by lines A—A of the perspective view FIG. 4 showing gas duct and current leads to the welding head;

FIG. 12 is a partial transverse section taken on line B—B of FIG. 3 coinciding with the weld plane $x$—$x$, showing electrode carrier and gas diffusion details;

FIG. 13 is a partial section taken on line C—C of FIG. 6 showing one form of gas diffuser element;

FIG. 14 is a partly disassembled perspective view of an alternative gas diffuser, the view being similar to FIG. 6;

FIG. 15 is a diagram showing operating states throughout an automatic welding sequence;

FIGS. 16 through 21 show a tubing joint section in the weld plane, correlated with abscissa positions of FIG. 15 and illustrating electrode displacements and programming intervals;

FIG. 22 is a schematic circuit diagram showing interrelated supply and control electrical subsystems for carrying out automatic programmed welding; and, FIG. 23 is a schematic diagram of switching circuits actuated in response to predetermined angular displacements of the electrode.

Figure 1:
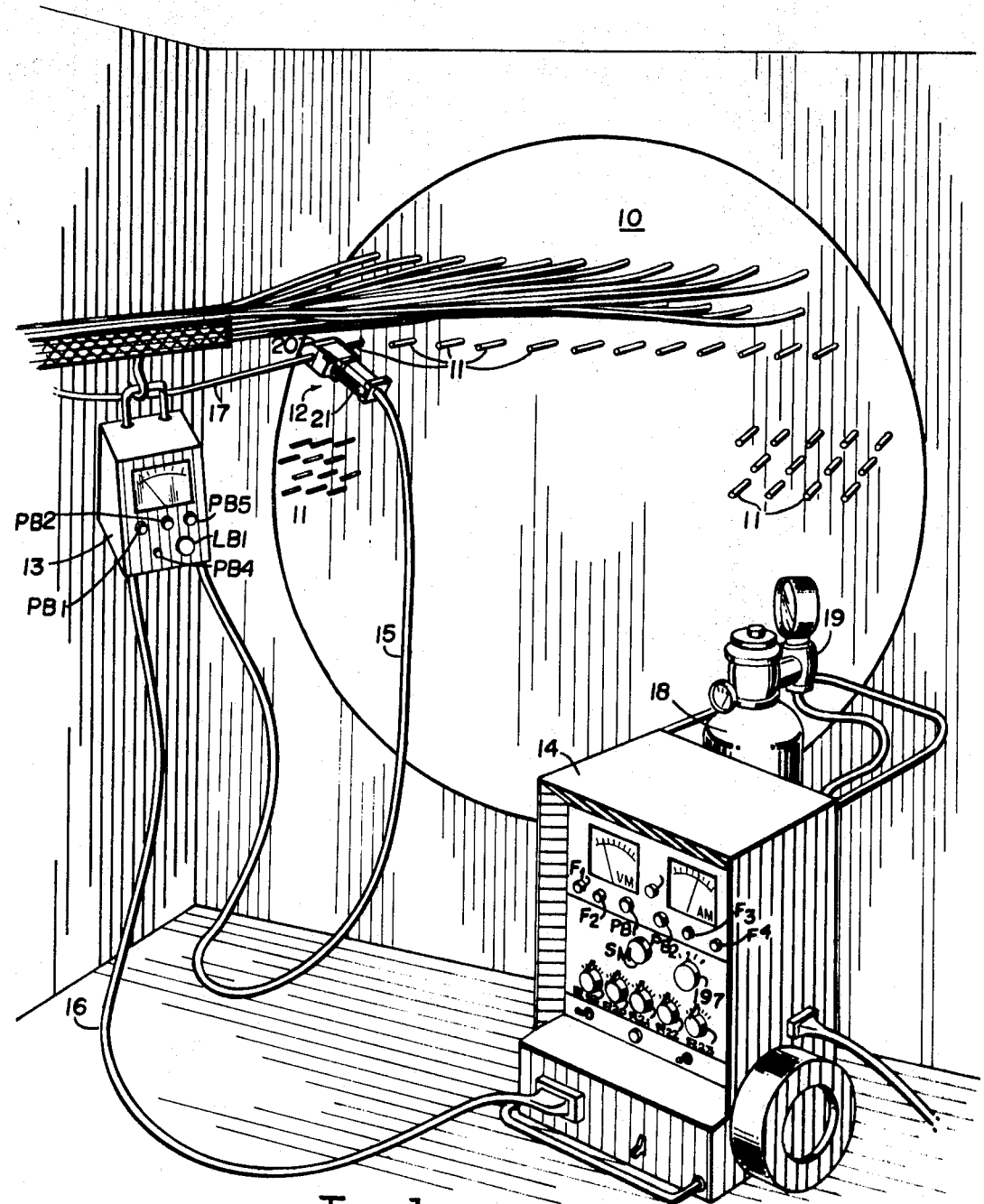
Figure 23:
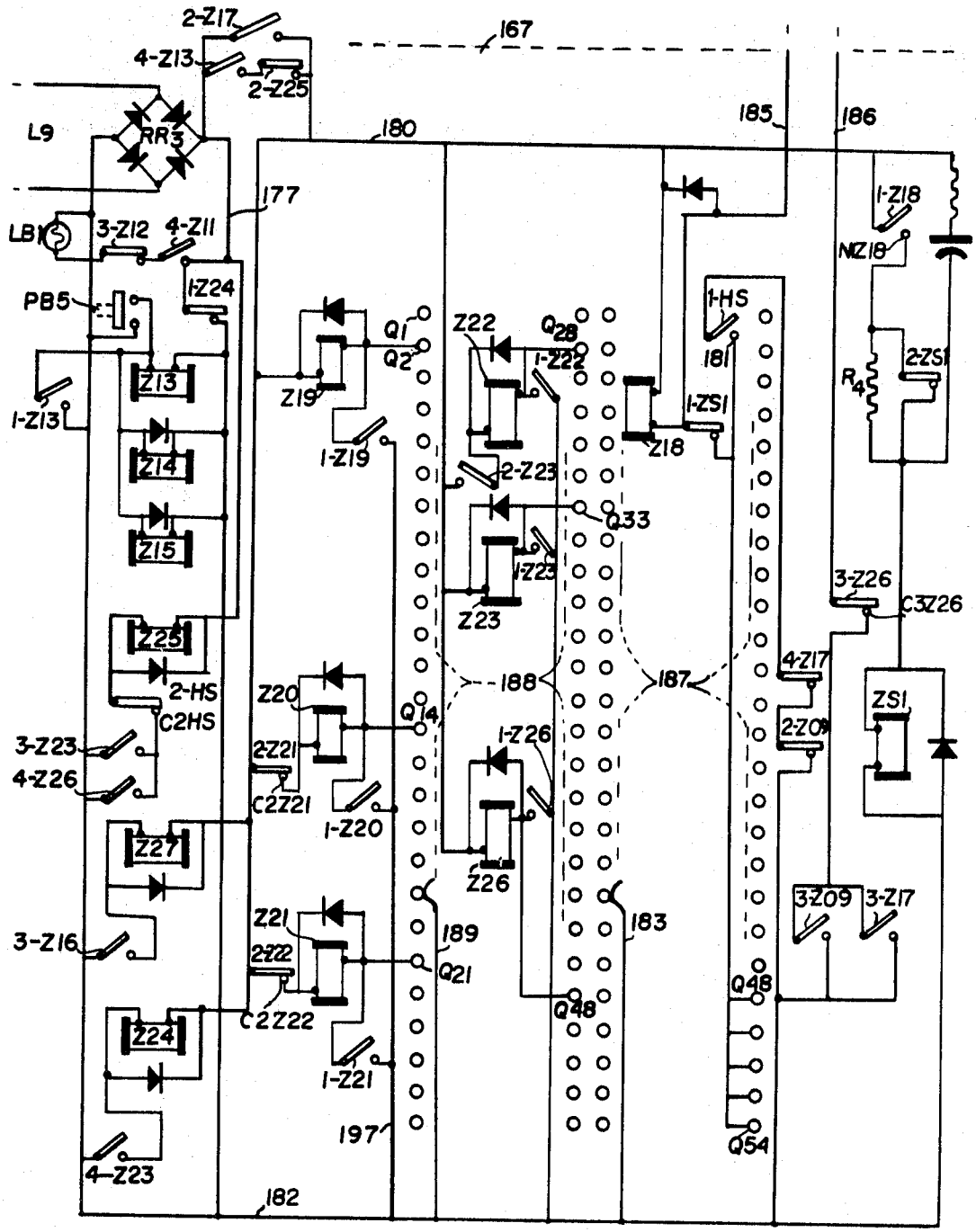

Referring to the drawings, the apparatus shown in FIG. 1 comprises an operational arrangement at a wall or panel 10 through which a large number of tubing ends 11 of various sizes extend, of a portable welding unit 12, a separate indicator box 13, and a remote supply and control equipment 14 which may also include graphic data recording means (not shown), the units of the system being electrically interconnected by lengths of cables 15 and 16. These cables carry the electrical and signal conductors and shielding gas conduits, to be described hereinafter. Unit 12 is mounted on one of the projecting tubing ends 11, being supported by means of a clamping and grounding device to be described hereinafter, and itself supporting the end of a free length of tubing 17 which has been inserted into the opposite side of the head for joining with the end 11. A supply of inert gas, such as industrial welding grade argon or helium, contained in a pressure vessel 18, is fed at reduced pressure by conventional reducing valve and flow control means 19 to the control unit 14 from which gas is supplied to unit 12 for shielding the weld as well as providing coolant atmosphere following cessation of the arc. A similar equipment (not shown) is provided for carrying out internal purging of the tubing line prior to welding, and maintaining a selected pressure therein if required during the welding.

Referring also to FIGS. 2, 3, 4 and 5, a separable weld head 20 forms the forward part of the welding unit 21, and a separable handle portion 21 the rearward part, the latter carrying cable group 15 including positive supply lead 22 with a multiconductor group 25 consisting of motor drive and speed control conductors and electrode increment signalling lines. The negative supply lead 23 and the shielding gas conduit 24 are combined as a single conventional "TIG" cable.

The weld head comprises a metal body 26 of nonmagnetic properties, preferably formed as a rigid one-piece hollow block housing having upper and lower bounding walls 26A, 26B and end walls 26D, 26E, the rearward portion being of irregular shape and having openings to receive a drive transmission and gas diffuser elements insertable from the rearward side, as will be described hereinafter. A pair of pivoting clamping arms 28 spaced on opposite sides of the head are pivoted on pins 29 which extend laterally from forwardly projecting parts of the end walls 26D, 26E. A cover 27 in the form of a segment of a cylindric shell having planar opposed end walls 27A and 27B is pivotally supported on the insertable pins 29. The hinge axis of the cover is slightly offset forwardly of the tubing axis, and each end wall of the cover is provided with a recess 141 having radially spaced bounding edges centered on the hinge axis, with such spacing that the cover may be closed toward the upper wall of the housing 26A, the recess closely fitting the tubing line.

The clamping arms 28 carry links 30 pivotally joined with the other ends of the arms remote from pivots 29 by pins 31. The other ends of links 30 are provided with screw threading 32 to receive spool nuts 33 which are provided with flanges 34. The latter engage a shoulder 34A when they are turned up, if links 30 have entered slots 30A recessed into the upper wall 26A of the housing.

The tubing ends 17 and 11 rest in seats 145 formed in the sidewalls 26D, 26E of the housing, the seats comprising aligned V-grooves having planar side walls with an included right angle between them. Hence when flanges 34 are tightened against shoulders 34A each tubing is held clamped with line contact by the planes of the seating grooves and the underside of clamping arms 28, which is shaped with an intermediate recess 35 of concave profile, which provides a line contact clamping surface. Inasmuch as a number of different diameters of tubing may be welded with one head, a like number of covers 27 having sidewall recesses dimensioned to fit each size of tubing, and removable inserts to modify seats 145 will be provided, as will be described later.

As may best be seen from FIG. 3 showing a plan view of the head with the cover 27 swung into open position, and from FIG. 6 showing the disassembled relationships of component parts in perspective, the fixed tubing end 11 is clamped into the right hand side of the head and its external end face 36 is located precisely in the welding plane $x-x$. The free length of tubing 17 is clamped in the left seat with its end face 27 closely abutting the face 36.

The head 20 carries a one-piece stationary insulation block 38 having a cylindrical forward surface portion 39 and having an axial slot 40 opening along its length, the peripheral width of this slot being such as to freely pass tubing of a range of diameters when entered sideways, i.e. in a radial direction. A through axial bore 41 communicates with the entire length of the slot and opens also into the enlarged axial bore 42 formed in the spool end adjacent the welding plane. A shoulder 43 formed at the junction of bores 40 and 41 supports a spring-loaded slip ring 44 which has a sectoral portion 45 open in alignment with the slot.

A revoluble spoollike member 46 shown in FIG. 6 in a position rotated about 140° anticlockwise with respect to the stationary block as viewed from tubing 17, is also provided with an axial slot 47 coextensive with the spool, the inward portion 48 of which is constituted by a bore coaxial with the spool and of a diameter equal to the slot width, which is made ample to receive the largest diameter tubing of a given range of sizes to be joined in the head. The exterior surface of the spool is provided with bearing faces 49 spaced adjacent the ends, to permit the spool to be revolubly supported within the bore 41 of the block. An enlarged diameter cylindrical end portion 50 of the spool forms a shoulder 51 at its junction with one bearing face 49. The portion 50 is adapted to turn freely in the larger bore 42 of the block 38. It is also provided with a shallow bore 52, thus forming a cylindrical flange. Slot 47 extends through the flange, and an additional gap 53 is provided at a point located about 120° from slot 47, for access to the welding electrode, as will be made evident hereinafter.

The spool 46 carries a slip ring 54 which is held against the shoulder 51, this ring being likewise interrupted circumferentially by the slot 47. A planar end face 52' which is disposed perpendicular to the spool axis forms the inward terminus of bore 52. A pivot pin support bore 55 is recessed perpendicularly into this face, adjacent the flange gap 53. An additional bore 142 arcuately spaced from bore 55 is provided to pass a flexible conductor for carrying welding current from ring 54 to the electrode holder.

The electrode support member 56 comprises a rigid body of metal such as brass having the form of a quarter segment of a thick-walled cylindric shell, the member having an integrally radially extending pivot arm 57 adjacent one end and an electrode clamp 65 extending laterally from a side of the segment remote from arm 57. This arm is pierced by a transverse bore 58 in which a screw-threaded pin 59 is adapted to be received for pivotally supporting member 56 when the pin is secured in sleeve bore 55. The arm extends into flange gap 53 but does not project outwardly beyond the cylindric surface of flange 50. Member 56 and clam 65 are further pierced by threaded radial bores 135 and 61 respectively, the bores being spaced axially side by side. Bore 60 which is located nearer the face 54 carries a threaded plug 62, preferably of a ceramic insulating material, having a length such that a rounded inner end 63 projects adjustably toward the surface of tubing 11 to provide a precise spacing between the cylindric surface of the work and the electrode 64. Spring loading to bias the electrode carrier toward the work is provided by spring 146 having one end received in bore 147 of member 56 and the other end bearing against the inner surface of flange 50. The electrode clamp bore 61 is intersected by the axially extending slot 142 in clamp member 65 which is split in the radial bisecting plane. The electrode comprises a slender rodlike body of and alloy, for example having a rotation of 1/16 inch and comprising thoriated tungsten having 2 percent thorium content. The point will usually be spaced about 0.055 to 0.065 inch from the work, precisely in the weld plane $x-x$, the adjustment being made by turning threaded plug 62 in threaded bore 60. As the electrode will require to be frequently replaced during commercial work the provision of easy access and adjustment is essential. The electrode clamping bolt 65A which draws together the two halves of clamp 65 is readily accessible when the cover 27 is open, since it lies axially beyond the ends of spool 46 and block 38.

Spool 46 has fixed on its end, remote from flange 50, a coaxial gear 66, provided with an inwardly extending opening 67 aligned with the slot 47. The gear teeth project slightly beyond the curved surface 39 of block 38, and are engaged by a pair of smaller diameter driving gears 68 and 68' forming the terminal gears of a gear box 69. The box is assembled into an open integral body having a planar rear face 70 carrying integral forwardly projecting sidewalls 71 and 72, between which extend axles 73, 74 and 75 respectively carrying gears 68, 68' and 76, and turning in ball bearings 77 held in apertures in the sidewalls. The gearbox further comprises input shaft 78 having a slotted rearwardly projecting end portion 79, and carrying a worm 80 engaging a worm gear 81 driving the gear 76. The latter is therefore caused to turn at a reduced speed when the shaft end 79 is revolved, causing the gear 66 and spool 46 to revolve by virtue of the engagement with gear 76 through intermediate elements such as 68, 68' or equivalent elements effective to act on gear 66 at points spaced along its periphery a distance not less than the width of the slot opening 67.

Welding current of negative polarity is led from the conductor 23 to the slip rings 44 and 54 and thence to the electrode 64 by a conducting path carried within an insulating sleeve 83 inserted forwardly into the head through a rearwardly opening aperture 82. The conductor branches as a flexible pair 86 which extend forwardly in the head, through bore 87 aligned with the aperture 102 and opening into the coaxial bore 42 adjacent the shoulder bore 43 in block 38. The forward ends of conductors 86 are connected to stationary ring 44, preferably by soldering into radial blind bores in the periphery of the ring in a manner to effect a low-resistance bond capable of carrying high-amperage current. The rearward ends of conductors 86 are connected to a metal plug 88 captively sliding within sleeve 83, the rearward face 89 of the plug being biased to the rear by a spring 90.

A button 91 screw threaded on the forward end of a lugged bolt 92 hold the latter captive on the forward wall of the handle unit, in a position to contact the plug face 89 of the head on assembly, compressing the spring within bore 82, and thereby transferring welding current to the head.

The positive ground lead 22 is led into the handle and extends through the forward wall as a rodlike member adapted to slide forwardly into the housing aperture 84 located above the aperture 82. A socket screw 85 accessible from above is turned down to anchor the end of lead 22 securely in the metal housing, thereby bringing the positive supply to the tubing seats and clamps.

The negative conductor 23 and the shielding gas conduit 24 are brought to the welding unit by a composite cable 93 which is of a type known in the art as "TIG" cable, wherein a tubular metal braid 94 is insulatedly covered by a layer 95 and conveys within its interior the gas delivered from reducing valve 19 and which is controlled by gas. valve means of the solenoid type in unit 14 — to be described hereinafter. The braid end is secured to a nipple 96 retained in the rear wall of the handle unit 21. A stranded conductor 23 is brazed to the margin of the forward side of the nipple, to carry the current within the handle separately from the flexible gas conduit 97 which leads the gas into the bore 98 opening into the rear face of the housing 26. The bore 98 is disposed just below the current supply aperture 82, and registers on bore 99 in the rearward face of the insulating block 38. A transverse bore 100 opening laterally into an end face 101 of the block communicates with the bore 99, to deliver gas from the aperture 102.

Aperture 102 is registered on an opening 103 in the side of a gas diffuser body 104, which according to one embodiment is formed as a U-shaped block having parallel sidewalls, fitting into a rearward opening on the left side of the housing and being bisected by the welding plane. The diffuser has a semicylindrical inner surface 105 centrally apertured by a square opening 106. The remainder of the cylindrical surface is finely perforated by numerous openings 107 small enough to be in the nature of pores, which are distributed uniformly, each opening being a short tube having a length not less than its diameter. The effect is to cause the shielding gas to issue in a radial direction as a multiplicity of fine jets, becoming a smooth mass flow at low velocity and very low turbulence by the time it has moved to the area of the joint.

The handle portion, generally designated 21, comprises a forward end block 108 and a rearward end block 109, which are clampedly engaged by through bolts 110 with the ends of a sheet metal tubular housing 111. As may best be understood from FIG. 7 and FIG. 8, with reference also to FIG. 5, the handle portion encloses a speed-controlled electric drive motor 112 provided with a reducing gear train 112 at its output to transmit a low r.p.m. output at forward shaft 114 and provided also with a reducing gear train 115 to deliver an output shaft rotation of rearward shaft 116, for generating signals representative of angular displacement imparted to the spool 46 by the action of the motor. The motor additionally supplies an output signal from a self-contained speed responsive generator G1 (see FIG. 22) — not shown in FIG. 7 — for use in the supply unit 14 to regulate the power supplied to the motor to ensure that the selected drive speed remains constant, as will be elaborated hereinafter.

Output shaft 114 is provided with a flattened end 117 for axial engagement with the slotted end 79 of the gearbox shaft, permitting the end block 108 to be quickly coupled against the rearward side of the housing 26, when the rod end 84 of the positive ground lead and the projecting end of gas tube 97 have been inserted into respective apertures 85 and 82. The handle is then secured by machine screws 118 extending forwardly through block 108 to enter apertures 118A in the head.

The handle portion carries along its left side a tubular member 119 of rectangular section which projects somewhat forwardly of block 108 and which has integral mounting flanges 120 adapted to be secured upon the sides of end blocks 108, 109 so that the member 119 is aligned with the square opening 106 in the gas diffuser body 104 when the handle is fitted for joining with the head. The tube 119 fits closely within the opening 106, and extends to a position in the interior of the gas diffuser just short of its cylindrical surface 103. As may be seen in FIG. 13, the aperture 106 is sleeved by a pliant member 121 to form a gas-retaining seal around the exterior of member 119.

Within the member 119, a sliding rod 122 is guidedly reciprocable to extend a forward portion 123 having a reduced width in the axial direction of the head to a limit position locating the right-hand face 124 of the rod extension precisely in the weld plane and also intersecting the tubing axis. When so extended, face 124 serves as a stop against which the face 36 of tube end 11 may be set to locate it accurately in the weld plane prior to its being clamped by the right-hand clamp arm 28. The spool 46 is previously set in a position such that the electrode holder 56 is on the side remote from aperture 106, i.e. with slot 47 aligned with the slot 40 in the block 38 permitting insertion of the tube into the head.

The handle housing 111 has a flat-walled side portion 127 opposed to the flanges 120, and is cut away to provide an elongate slot 128 through which an inward projection of actuator pin 125 extends into the housing. A flange 129 turned inwardly from the wall 127 supports the miniature switch 130 disposed with a forwardly extending actuator pin 131. The pin 125 is located in the rearward portion of the slide so that it is effective to engage the resilient metal strip 132 carried by the switch mounting 133 projecting into slot 128 and hold the strip retracted and the switch actuated to closed-contact state, only when the slide is in its fully retracted position. This position corresponds to the condition that the rod extension 123 is fully retracted from the weld chamber. As soon as slide 122 is moved fractionally ahead, the contacts of switch 130 are opened. The drive circuit for motor 112 is thus disabled, preventing any movement of the spool and electrode.

The slide 122 is provided with a resiliently loaded ball detent 126 which engages rearward depression 126A in the wall of member 119 to tend to hold it in fully retracted position, and which engages forward depression 126B to hold it in its forward position.

The handle portion also carries a reed type of switch 134 supported on the inner wall of the end block 109, disposed to the rear and to one side of the signal shaft 116 so as to be actuated by the influence effected of the poles of a bar magnet 135 carried on a disc 136 fixed on the shaft. For each revolution of shaft 116, switch 134 effects one complete on-off switching cycle between terminals 137. When the reducing gear trains 113, 115 are suitably chosen in conjunction with the ratio of worm-and-gear drive members 80, 81 and gear sets 66, 68 and 76, the switching cycle may be made to represent electrode rotation through 15°, or any other increment desired. The reed type of influence switch, being not directly connected with the motor and drive train, offers the advantages that the signal generator is made independent of the positions of the electrode spool or of the program registers in resetting these components when a weld cycle is incompleted for any reason. Independent restoring of the program follower apparatus is provided for and the operator may select spool rotation forward or backward without influencing the program follower apparatus.

The flow path of the inert shielding and cooling gas fed to 135 unit from conduit 95 may now be traced in detail, by referring to FIGS. 11 and 12 additionally. In FIG. 11 the gas supply tube 97 leading through the forward block 108 of the handle portion is shown with its end portion compressed into aperture 98, forming a gas seal, and discharging gas into the straight bore 99 extending forwardly through the housing 26 and through the bearing block 38. The lateral bore 100 which bottoms on the forward end of bore 99 leads the gas to the aperture 102 and thence into the registering aperture 103 in the right-hand side of gas diffuser 104, as best seen from FIG. 13. Considering FIGS. 7 and 12, the flow will be seen to spread through a space 138A inside the gas diffuser body, this space being bounded on its forward side by the perforated cylindrical face 105, and issues through the numerous channels 107 therein to diffuse gently throughout the weld chamber 138. The boundaries of this chamber comprise the forward face of the gas diffuser, the inner surface of a stationary cylindrical segment 139 carried by the forward portion of lower housing wall 26B, the inner surface of the cylindrical segmental part of cover 27, the inner surface of the forward extension of left housing sidewall 26D, designated 140, and the faces 52' of the spool and 101 of block 38.

While it is essential that leakage occur in order that the inflowing gas may purge contaminating gases from the weld chamber, the cross-sectional area of the total leakage paths should be restricted to avoid introduction of contaminants by convection of the heated contents of the weld chamber, and to keep gas motion below a velocity likely to disturb the arc. The principal flow paths for gas passing through the chamber 138 extend along the tubing lengths 11 and 17. Gas issues from each side of the welding head 20 through small gaps under the clamp arm seats 35 and between the tubing seats 145 and the tubing, as well as through the recesses 141 formed in the margins of the sidewalls 27A and 27B of the cover adjacent the tubing. A very minor leakage occurs between the segment 139 and the cover 27, and also between the junction of the margin 143 of the cover segmental portion with the shoulder 144 formed along the forward margin of upper housing wall 26A. The arrangement provided in the welding unit has been found to permit satisfactorily rapid flushing with low supply pressure — for example, ½ inch to 3 inch of water column — while maintaining such low chamber velocities that arc flutter and wander are avoided. The chamber is moreover so constructed that the heated gaseous atmosphere surrounding the weld metal and the electrode during the welding operation, regardless of position, is gently convected with low circulation velocity. The principal cooling surface is the cover 27, which is of large area, in good heat conduction contact with the massive housing 26. The structure has ample heat storage capacity so that the welding of the largest diameters of tubing does not cause undue rise of temperature. It is therefore unnecessary to use a larger flow of gas as has been previously required in other welding devices to safeguard the components. It has been found also that the shielding gas flow which is maintained after the welding current is cut off in order to avoid oxidation of the heated metal provides adequate cooling of both the bead and the electrode support 56.

Where a large number of joints are to be welded in tubing of smaller diameter where alignment of the end faces is extremely critical, the unit shown in FIG. 9, having a built-up housing providing a unitary seating member having precision-machined hard-faced clamp seats is suitable. The forward margins of housing 26 are machined as a planar surface 205 parallel with the tubing axis, and the member 206 formed of a nonmagnetic hardenable metal having parallel-machined top and bottom marginal surfaces 207, 208 is secured on surface 205, as by dowels 209 and screws 210 extending forwardly through sidewalls 26D, 26E. Seats 145 are prepared previously, by machining and grinding in one setup, so that the respective seating faces of the V-grooves are truly coplanar with each other.

The modified clamping seat form of FIG. 10 may be employed alternatively where it may be advantageous to utilize a single welding head for joining tubing sizes of a range of diameters at a field location, by providing the operator with a kit of insertable seat modification devices with hardened seating faces. The form of the housing is the same as that shown in FIGS. 2 and 3, wherein the housing sidewall portions 26D and 26E are shaped to provide a seat 145, the cross section of which is of "V" outline with an included angle of 90 degrees, and a depth such that the largest diameter of tubing compatible with the slot 47 of spool 46 may be seated therein coaxially with the spool rotational axis. When tubing of lesser diameter is to be welded, an appropriate insert 148 is secured in each seat 145, having planar underfaces closely seating against the seat faces, and having planar upper faces 145' located so as to align the smaller tubing coaxially with the electrode spool. An insertable pin 149 is received in a shallow blind bore 150 recessed into the underside of the insert and is received in a bore 151 in the housing sidewall 26D to retain the insert, which may be removed readily by lifting it off the seat 145. To accommodate the clamping arm for lesser diameter tubing, it is only necessary that the threaded length of link end portion 32 be such that flange 34 of nut 33 may be turned on a distance sufficient to enable it to bring pressure on housing shoulder 34A.

For convenience in mounting the welding unit on a fixed end of tubing, the clamp arms are provided with toggling action so that they will stay in an open position when swung away from the seats 145. As will be evident in FIG. 9 the pivot end of clamp 28 is formed with an arcuate face 154 merging with a short straight portion 155 aligned with the length of the arm. A spring detent 156 secured on the forward end of the pivot support extension 140 of the housing sidewall has a rolled end 157 sliding on face 154. When arm 28 is swung to open position the rolled end 157 is lifted against the spring force by the flat portion 155, and on further opening motion latches by friction over the shoulder 158 formed at the end of the flat 155. The arms are thus held open to avoid interfering with tubing entry, until forcibly rotated by the operator as needed.

In embodiments where gas motion in the welding chamber must be suppressed to the greatest possible degree, as for example in highly miniaturized welding units for fine tubing, an alternative diffuser screen 105' shown in FIG. 14 may be provided, which has the characteristics of a porous plate with very fine openings occupying the position of the semicircular screen 105 in the diffuser of FIG. 6 and FIG. 13. The element 105' may comprise a sintered body of polycrystalline refractory such as carborundum of thin arcuate strip form, or where the issuing gas need not be so finely diffused, it may comprise a flexible woven or braided band such as glass cloth or braid.

Such strip or band material is suitably cemented into place on the forward cylindric side of the diffuser body 104.

A description of the electrical apparatus employed in automatic tube welding will now be given in detail, with reference to the diagrams of FIGS. 15 through 23. In this description the principal events will be reviewed in their normal sequence in an automatic weld cycle, under appropriate headings, and certain phases subject to manual control are also described. For a visual summary of the events, reference should be made to the graph, FIG. 15, and correlated weld joint cross sections of FIGS. 16 through 21, for an understanding of the progress of the welding. In referring to the schematic circuit diagrams, FIGS. 22 and 23, the electrical subsystems will be seen to comprise the following principal interrelated functional blocks demarcated by dashed boundary lines, and having the functional identification appearing below:

159 is a stop-start control block, the button controls being actually located in two separated locations;

160 is a gas and motor drive control block;

161 is a high frequency voltage supply;

162 is a supply of high open-circuit voltage of limited maximum current;

163 is a supply of SCR-controlled main arc current;

164 is a weld program register comprising potentiometers;

165 is a speed control subsystem;

166 is a graphic data record system; and, 167 is a weld sequence control subsystem.

A purging flow of inert gas is provided as shown by trace 168 prior to initiation of the arc or any rotation of the electrode. After a predetermined time has elapsed, sufficient to ensure that only uncontaminated argon, for example, fills the weld chamber, a high-velocity striking voltage is fed briefly to the electrode to initiate an arc, as shown by trace 169, simultaneously with application of an elevated open-circuit voltage indicated by trace portion 170A. Upon formation of the arc the high open-circuit voltage and the high-frequency voltage are promptly cut off and a controlled high-amperage current is supplied to the electrode to effect preheating and melt a weld puddle on the joint, without electrode rotation. The initial arc current is at its highest, as may be seen at trace 170B.

At the end of the preheating interval the electrode commences to revolve about the tubing axis at constant angular speed, this operation continuing as depicted by trace 152, the angular displacement being indicated by abscissa line 153 above it marked in increments of 15°. The current is reduced to a main welding value as designated by trace 170C, which extends a distance representing a peripheral length somewhat over 180° around the joint, FIG. 17. Interval responsive switching signals are generated from the time when electrode rotation begins, as shown by trace 171. The welding current follows the program of values, decreasing as at trace portion 170D followed by a second decrease in amperage designated by trace portion 170E, and a final taper from a low value to zero designated by trace portion 170F corresponding to electrode rotation beyond one revolution and extending 120° or more of a second revolution of the electrode, to the position of FIG. 20.

The flow of shielding gas is continued after the arc is extinguished, a cooling control (trace 172) extending the flow time (trace 168) beyond the termination of portion 170F while cooling effect is required to prevent contamination of the weld metal.

The system continues electrode drive for an interval until the count of incremental displacement pulses generated at switch 130 received at the program follower corresponds to the return of the spool 46 to its initial position, which occurs at the end of two complete revolutions. At this time the slots 40 and 47 are in registered relation permitting work to be removed or passed into the spool. The motor is stopped at this moment, whereupon the program follower advances the self-stepping unit to its home position as shown by trace portion 171A.

While the high-frequency arc-starting voltage is shown as being a brief burst (trace 169) the system is responsive to extinguishing of the arc throughout the entire program, and in the event that an extinction occurs, shown by the downward line 170C′ breaking from trace 170C, the HF striking voltage is at once reapplied, trace 169A, with high open-circuit voltage 170A′, thereby maintaining even heating.

In the following detailed description of the electrical interactions throughout a welding cycle, in order to avoid cumbersome naming of relays, poles and contacts involved in tracing circuits, a scheme of alphanumerical coding will be followed. According to this scheme, the load represented by a relay winding or coil is designated by the prefix letter "Z" followed by either a letter digit identification, or a two-digit number, as "Z15" or "ZS1." Specialized loads such as gas valve operating solenoids may be designated "ZG1." A rotary stepping switch coil load is designated "ZS1." The poles of a pole group are identified by a prefix number denoting the positional relation of the pole followed by a dash, followed by the relay code. For example, the third pole or switch arm of relay Z17 will be treated simply as a quasi-noun:

"3Z17."

The contact with which a pole or switch arm makes connection on being actuated from an open condition is designated by the prefix letter "N" followed by the pole code omitting the dash, while a contact which is normally closed and from which the pole is disconnected on actuation has instead the prefix letter C, regardless of the actuation state of the relay or switch; as examples, N2Z11 and C2Z17. Where actuation is nonelectrical as for example by a cam or manual switch, the coding omits "Z" and in lieu thereof some combination of "S" is used in a manner analogous to that discussed; for example, a first pole of a homing switch is

"1-HS."

STARTING-UP SEQUENCE

The operator presses a button PB1 in unit 159, after having set S1 in unit 161 on contact 174, thereby extending the circuit to the open pole 3-Z11. Gas purge switch S2 is closed as are all breakers F4, F5, F6 and F7. The sequence mode switch SM in unit 164 has been set in the "automatic" mode position, i.e. on the contact 175, except where manual variation is intended during empirical trial welding, in which case the switch will be set on contact 176 for "manual" mode. The recording unit 166 is energized in preparation for use, Reversing motor switch SR in unit 165 is set in the "forward" drive position.

The actuation of pushbutton PB1 energizes Z10 in unit 159, which is self-holding by supply to its winding over 3-Z10. Supply voltage is now fed from mains by way of poles 1-Z10 and 2-Z10 to main transformer T2.

Open circuit unidirectional voltage is now supplied from the secondary L3 and ring rectifier RR1 to the voltage-sensing relay Z11, located in unit 162. The postweld coolant gas flow relay Z07 in unit 160 is energized from secondary L5 over 1-Z08 closing on N1Z08. A path is provided by 1-Z07 and C1Z07 to energize gas solenoid ZG1, causing a prepurge of shielding gas to flow to the head 20 during a short interval while 1-Z07 is actuated to open position and the solenoid returns to valve-closing position.

The recording unit 165 is also energized from a separate supply (not shown) where visual data recording is desired.

In program register unit 164, 1-Z11 closes on N1Z11 to switch reference potentiometer R19 into the program current control circuit of unit 163, a path being thus provided for unidirectional voltage supplied from ring rectifier RR2 and secondary L7 to be led to the firing control unit 178 which is supplied with AC from secondary L6.

2-Z11 is disconnected from C2Z11, but this has no effect on Z09 since series-connected 3-Z13 of the preheat time delay function is open at this time. When 3-Z11 closes the high-frequency striking unit 161 remains inactive since 1-Z16 is still open. 4-Z11 closes to energize lamp LB1 (see FIG. 23)

over 3-Z12 and C3Z12, informing the operator that the indicator box 13 is signalling readiness of all units for an automatic welding cycle to begin.

Depending on the shielding gas purge flow required, the timing relay Z07 will have released 1-Z07 to deactivate ZG1 and shut off the flow of inert gas, usually after about 8 to 10 seconds, when the weld chamber will be filled with pure argon. It is to be understood that the internal purging of the tubing will have been completed before hand by the operator, and that the line holds a filling of gas under a steady low pressure, which is adjusted and monitored manually. It is also to be understood that the operator has satisfactorily prepared the tubing ends 36 and 37 and that the lengths 11 and 17 are correctly and securely clamped in head 20, as evidenced by minimum leakage through the joint into the chamber of the contents of the line. The operator may now cause the actual starting of the automatic welding cycle.

WELDING SEQUENCE — ARC INITIATION

The operator presses PB5 at the pendant box 13 thus energizing the sequence start relay Z13 and the breakers Z14 and Z15 in unit 167, and extending the unidirectional current path from secondary L2 by way of silicon-controlled rectifiers SCR1, SCR2 and diode D4 over breaker arms 1-Z14 and 1-Z15, to provide a series feed through high-frequency secondary L13 to the negative electrode 64, and by way of meter shunts RS1 and RS2 to the positive work, i.e. to the housing 26 and clamps 28 of the weld head. Meter M3 (in the pendant box) is thus put into circuit to visually indicate the current flowing in the arc, while the current pen of the recording ammeter responds to the signal to trace a visual record similar to traces 170B–170F.

Actuation of 1-Z13 provides a self-holding path for this sequence start relay when PB5 is released; closing of 2-Z13 energizes both the instantaneous and the delayed-action poles F-Z08 and D-Z08 of relay Z08 in unit 160; closing of 3-Z13 is without effect on the preheat timing relay Z09 since 2-Z11 was previously actuated to open state; closing of 4-Z13 energizes the weld sequence circuit supply bus 180 (FIG. 23) from the output of ring RR3 in unit 167, polarizing one end of each coil of relays Z25, Z27, Z24, Z19, Z20, Z21, Z22, Z23, Z26 and Z18.

It is to be understood that stepping switch ZS1 is correctly "homed" before the operator presses button PB5. However if it is not at home position, and cam switch 1-HS is still closed on contact 181, this would provide a series path to energize the stepping switch control relay Z18 over 1-Z26, 1-HS, 4-Z17, and 2-Z09 from bus 180 and negative bus 182. When 1-Z18 closes on N1718 a path is provided over this pole and contact in series with R4 and side path 2-ZS1 to the coil ZS1, stepping thereupon continuing until the home position of wiper 183 is reached, and cam switch 1-HS remains open, as will be described in further detail in connection with the end of the cycle.

When Z08 was energized by the actuation of Z13 (see above) the fast pole F-Z08 promptly opens, deenergizing the postweld gas flow relay 207. 1-Z07 recloses, causing ZG1 to feed inert gas to the weld chamber 138. After the delay inherent in the device, D-Z08 closes, energizing high-frequency striking control relay Z16. This relay's pole 1-Z16 closes, completing a circuit to supply AC from secondary L4 to the primary of T3 over S1, contact 175, 3-Z11 and 1-Z16 in unit 161. The step-up transformer T3 produces an AC voltage in secondary L11 sufficiently high to break down air gap SG and to produce oscillatory energy at a radio frequency determined by the constants of capacitor C1 and transformer T4 loading L11. The oscillatory energy is fed to the primary L12 of T4 and is superimposed in the series secondary L13 in the welding circuit, a return path being provided by capacitor C5. The high voltage and steep wave front of the striking voltage fed to pointed electrode 64 breaks down the gap between it and the work, initiating an arc, which is maintained at an average voltage drop of about 11 volts depending on work surface condition, electrode spacing, and purity of the gas in the chamber.

The closing of 2-Z16 in program register unit 164 maintains R19 grounded at its tap point 190A independently of 1-Z11. The closing of 3-Z16 energizes voltmeter control relay Z27 in unit 167, while the closing of 4-Z16 starts the recorder drive motor MD.

PREHEATING SEQUENCE

The weld cycle has now begun, the electrode remains stationary, and the current fed to the arc is automatically regulated to the "preheat" value determined by potential of conductor 192 leading from SM, which is at the potential of the tapping point 190A on R19, the ends of which are respectively at the stabilized positive potential of the junction between CR4 and CR5, and the end of resistor R24 in a shunt circuit across the terminals of CR5 including the paralleled potentiometers R19–R22. The current stabilization, which will be elaborated hereinafter, depends on the maintenance of a constant voltage drop across the resistors R8, R9 in series with the arc, which is in a predetermined ratio to the potential difference established at the tapping point of the program potentiometer selected. As soon as the open-circuit state of the welding circuit has disappeared by formation of an arc, the voltage sensed by relay Z11 falls, causing release of 1-Z11 in program register 164, the reclosing on C2Z11 of 2-Z11 in unit 160 to complete a path over closed pole 3-Z13 to the preheat timer relay Z12, release of 3-Z11 in the high-frequency supply circuit in unit 161, and release of 4-Z11 extinguishing LB1 in pendant box 13.

By this time the slow-closing pole 1-Z27 in unit 167 has applied electrode voltage to input lead 184 of the recording unit 166, while 2-Z27 closes to energize the voltmeter VM in block 163, physically located at the supply unit 14.

Slow-to-close pole 1-Z09 in unit 160 now closes, energizing motor control relay Z12 as well as the "sequence off" control relay Z17. 2-Z09 disengages its contact C2Z09 in unit 167 making it impossible for self-stepping of ZS1 through cam switch 1-HS during the weld sequence. The only path now provided for energization of Z18 is through reed switch SR terminals 185, 186 over normally closed 3-Z26 and 3-Z09 which closes.

When Z12 energizes and 1-Z12 closes, the speed control unit 179 in block 165 is supplied from secondary L8 over the series path formed by 2-Z26 on C2Z26 and 1-Z12 on N1Z12. If slide-sensing switch 130 is closed, motor drive of MT in the welding unit handle is now initiated, advancing the electrode at a uniform rate determined by the setting of rheostat 197 which has been preselected for the particular joint being welded.

WELDING SEQUENCE

Upon energization of Z12, 2-Z12 closes and keeps chart drive of the recorder motor MD energized independently of 4-Z16. 3-Z12 releases from C3Z12, preventing lamp LB1 from lighting unless the motor stops rotating.

When Z17 energized, 1-Z27 closed, keeping Z17 and Z12 energized from L5 in unit 160, independently of the path including pole 1-Z09. As 2-Z17 closes, the sequence control bus 180 and the reed switch SR become supplied with positive unidirectional voltage independently of the path over pole 4-Z13. The closing of 3-Z17 provides a path around 3-Z09 making the reed switch signalling independent of the relay Z09. The disconnection of 4-Z17 from C4Z17 assures protection against self drive of stepping switch ZS1.

At the time when electrode 46 has advanced one increment, in this instance through 15 degrees of arc along the joint periphery, the terminals 185, 186 momentarily become connected through SR, actuating Z18. This closes 1-Z18, energizing ZS1 over a path including 1-Z18 and 2-ZS1 disconnects from C1ZS1 but this is without effect since 4-Z17 is open and wiper 183 of the control bank is on a point below the switch point group Q48–Q52. 2-ZS1 disconnects from C2ZS1, reducing the current by leaving paralleled resistor R4 in the supply circuit to ZS1.

The opening of SR deenergizes Z18, causing 1-Z18 to open and deenergize ZS as well as the event pen of the recorder, to mark an abrupt drop in the trace. When ZS is deenergized the spring delivers stored energy to ratchet the wipers 183 and 189 simultaneously along their respective point banks 187 and 188 through one step. The reclosing of 1-ZS1 and 2-ZS1 is without effect. In a similar manner, the wipers of ZS1 are made to follow the rotation of the electrode in synchronization therewith, the event pen recording a vertical line at the end of each increment. It is to be noted that at the first step, 1-HS recloses, but this is without effect since when 4-Z17 opens, 2-HS opens, keeping Z25 deenergized.

After a predetermined angular displacement of electrode 64, for example when the wipers 183, 189 have advanced to point Q2 signifying the end of the preheating current phase of weld current programming, relay Z19 in unit 167 is energized. 1-Z19 closes, self-holding the relay in actuated state. 2-Z19 disconnects from C2Z19, removing the tap potential of R19 from conductor 192 and preparing the firing control 178 to regulate the arc current at the next programmed level, determined by the connection of tap 190B of potentiometer R20 as 3-Z19 closes applying a different potential to reference conductor 192.

Once the electrode 64 is supplied with the main weld current as at trace 170C of FIG. 15, a lesser heating effect is imparted, this being necessary since by the end of the preheat phase the tubing has become strongly heated. The main weld current is maintained throughout an electrode displacement of a predetermined arcuate span, usually about 180 degrees, until wiper arms 183, 189 strike points Q14, initiating the first decay interval as Z20 become energized. The path to Z20 includes C2Z21 and 2-Z21 from bus 180 to bus 182 via the wiper 189, and self-holding by 1-Z20 and bus 197 connected to bus 182.

CURRENT REGULATION

The control of the magnitude of direct current in the arc circuit is effected, in known manner, by a saturable reactor type of firing control unit 178, connected with control elements of the SCR devices SCR1 and SCR2 supplied from secondary $L_2$. While such control systems are believed to be well understood, a brief description of the particular application of such control system in the present invention is deemed useful for its comprehension. A bias control winding $L_B$ in the unit has a threshold control rheostat $R_B$, for establishing a predetermined bias effect. Some or all of the control windings, $L_N$ are fed from the output of a DC amplifier 191, the effect of the current therein being to regulate the breakdown or "-firing" angle of the SCR units in the weld current supply to tend to reduce the error between actual current in the arc circuit, as sensed across R8, R9, and the intended program current as set by the selected potentiometer tap in register 164. The DC amplifier, which is of known type, is supplied with stabilized +12 volts at terminal (8) and stabilized −12 volts at terminal (4). The input, being the potential difference established in the comparison of potential of conductor 192 and the potential of IR drop across R8, R9, hereinafter termed "error," is applied to terminals 2 and 3, changes of potential being subject to capacitor smoothing. The DC amplifier delivers a current at terminal (1) and (7), which is passed through the control winding $L_N$ of the firing control 178.

FIRST DECAY CURRENT

To provide a gradual reduction of arc heating effect on the metal mass adjacent the joint, provision is made to avoid abrupt step decrease of arc current at the transition from one program register tap potential to the next lower potential, by connection of capacitor C14 across the series chain R8, R9, R10 and by connecting capacitor C15 between reference conductor 192 and stabilized conductor 196. When Z20 energized, 1-Z20 effects self-holding, disconnecting 2-Z20 from C2Z20 in the program register 164, removing tap potential of R20 from conductor 192. 3-Z20 closes, substituting the tap potential 190C on R21. The weld current decreases accordingly, along a more or less exponential curve and levelling off to the steady value as shown by trace 170D, which value is maintained for the remainder of the program interval assigned to this phase, until the wiper 189 strikes switch point Q21.

SECOND DECAY CURRENT

By the end of the first decay current the electrode rotation will have positioned the arc within a fraction of a revolution from the starting point, so that the remaining arcuate length of the joint will be at a relatively high temperature. Since it is imperative that the fluidity of the weld puddle not be allowed to develop to the point that it will run or sag, which would result in changes of external and internal diameters, a still lower weld current must be used in the final stages. The second decay current, illustrated by trace 170E, is initiated as relay Z21 becomes actuated and holds upon closing of 1-Z21, the path including 2-Z22 closing on C2Z22 from bus 180 to bus 182 via wiper 189 and conductor 197. 2-Z21 releases from C2Z21 deenergizing Z20; 1-Z20 opens, without effect; 3-Z20 opens, disconnecting tap 190C from reference conductor 192. The actuation of Z21 closes 3-Z21 on C3Z21, bringing the potential of tap 190D along potentiometer R22 to conductor 192, thereby effecting a reduction of welding current. The electrode will have advanced beyond one revolution during this phase of the program, smoothing the joint surface and eliminating any starting crater and ripple left by the initial welding phases. The low level of rewelding arc current continues until wiper 189 strikes bank point Q28.

END TAPER SEQUENCE

Z22 energizes, self-holding as 1-Z22 closes; 2-Z22 opens, deenergizing Z21; 3-Z22 closes, connecting the lower end of potentiometer R23 via SM to reference conductor 192. The tap 190E in this instance is used to adjust the resistance of R23 to a value which will yield an appropriate decay time constant with capacitor C15, discharging the residual voltage therein in the closed loop 192, 195, R23, C15. 3-Z21 now being released from C3Z21, tap point 190D of R22 is removed from the program control. The end taper of arc current is now operative. 4-Z22 opens, taking over from 4-Z21 in keeping R20 from being connected to conductor 192. When Z21 deenergized 1-Z21 opened, without effect; 2-Z21 closes, also without effect; 3-Z21 opens, as stated, ending the second decay phase. The taper current, trace 170F, fades to a level of about 3 amperes. Wiper 189 strikes point Q33, energizing Z23.

Energization of Z23 disconnects C2Z23 and thereby deenergizes Z22. 3-Z23 closes, however relay Z25 remains deenergized as cam-actuated pole 2-HS of switch ZS1 is off contact C2HS. The other side of the winding of relay Z25 is permanently connected to bus 180, which relay is involved in initiating shut-off of the control circuit 167. 4-Z23 closes, energizing relay Z24 which initiates the weld stop sequence. The deenergization of Z22 causes 1-Z22 to open, without effect on program register 164. The closing of 2-Z22 is without effect on Z21 as the wiper is not on the connected point Q21. 3-Z22 disconnects from N3Z22, breaking the path including potentiometer R23. As soon as 1-Z24 was actuated to break connection with C1Z24, the group of relays Z13, Z14 and Z15 are deenergized, disconnecting electrode 64 and housing 26 from the current supply, as breakers 1-Z14, 1-Z15 open. Open circuit voltage is established across Z11 from the output of RR1, causing this relay to energize. As Z13 deenergized, 1-Z13 opened, without effect; 2-Z13 opened, deenergizing timer relay Z08; 3-Z13 opened, deenergizing timer relay Z09; and 4-Z13 opened, without effect as 2-Z17 is still closed, supplying positive voltage to relay bus 180.

When Z11 energized, 1-Z11 closed, without effect on weld current which is at zero, the breakers being open. 2-Z11 opened also without effect; 3-Z11 closed in high-frequency supply unit 161, without effect as relay Z08 is unactuated. 4-Z11 closed but LB2 does not illuminate since 3-Z12 is open.

As Z08 deenergized, fast-acting pole F-Z08 closed, energizing the postweld gas flow timing relay Z07 over contact CFZ08.

FINAL COOLING

The delayed-action pole D-Z08 releases, breaking supply circuit to the relay Z16. When Z09 was deenergized, 1-Z09 opened, having no effect as 1-Z17 is closed. 2-Z09 closed, having no effect as 4-Z17 is still open. 3-Z09 opened, having no effect as 3-Z17 is still closed.

When Z16 was deenergized, 1-Z16 opened, keeping the high-frequency unit inoperable. 2-Z16 opened, with no effect on the program register. 3-Z16 opened, deenergizing voltmeter control relay Z27. 4-Z16 opened, having no effect on the chart drive since 2-Z12 is still closed.

1-Z27 opens, deenergizing the voltage pen of the recorder; 2-Z27 opens, deenergizing voltmeter M2. After a time delay characteristic of Z07, 1-Z07 opens, disconnecting from C1Z07, deenergizing gas flow solenoid ZG1, and preventing further flow of cooling inert gas into weld chamber 138. This event may occur a considerable time after the cessation of the arc, depending on the time interval desired, and as deliberately chosen in the devices.

RESETTING OF COMPONENTS

When by continued actuation of the reed switch 1-SR during the rotation of electrode 64 during the final cooling sequence, the stepping switch has been advanced so that wiper 189 of the second bank strikes point Q48, Z18 becomes energized, closing 1-Z18 and thereby energizing ZS1 from bus 180 via 1-Z18, 2-ZS1 and C2ZS1 to bus 182. 1-ZS1 is opened, deenergizing Z18, there being no circuit through SR. 2-ZS1 opens, reducing the current to ZS1, supplied now by shunt resistor R4. When Z18 is deenergized, 1-Z18 opens, deenergizing ZS1, so that the stored energy in the drive spring advances the wipers one step, bringing wiper 183 to point Q49. The sequence repeats until the stepping switch reaches "home" position and stops, with cam switches 1-HS open and 2-HS closed.

Upon energization of Z26 when wiper 189 struck point Q48, 1-Z26 closed to maintain the relay self-holding. 2-Z26 opened, disconnecting from C2Z26 and deenergizing the motor speed control unit 179, causing motor MT to stop, when spool 46 will have made exactly two complete revolutions (720°) since the beginning of the welding cycle. It is to be noted that where other intervals than 15° correspond to one increment, a sufficient number of switch points must be allocated in excess of the number at which two revolutions will have been completed, to provide self-stepping to "home" position.

Disconnection of 3-Z26 from C3Z26 makes the reed switch SR inoperative in the stepping switch control circuit.

At the instant when ZS1 reached "home" position, relays Z18 and ZS1 are deenergized, 1-HS being then open and 2-HS closed. The last operation energizes the sequence-stop-initiation relay Z25 since 3-Z23 is still closed, opening 1-Z25, and deenergizing Z17. 1-Z17 then opens, deenergizing Z12. 2-Z17 opens, deenergizing the weld sequence control circuit of unit 167 entirely. 3-Z17 opens, holding SR ineffective. 4-Z17 closes without effect, as 1-HS is open.

The chart drive is deenergized when 2-Z12 opens. LB2 becomes illuminated as 3-Z12 closes on C3Z12, signalling the end of the welding cycle, and restoration of components and systems in preparation for a succeeding welding cycle. All remaining relays, namely Z19, Z23, Z24, Z25 and Z26 will have also become deenergized. The system is now at the same state as it was just prior to the operator's pressing of push button PB5 which had initiated the weld sequence described.

EMERGENCY STOP

The automatic welding sequence described is intended to be wholly independent of human control, once it is initiated, and indeed the highest weld quality is attainable only when the controls provide the precise and unvarying currents required during electrode movement over predetermined arcuate lengths of the tubing periphery. It is however not impossible that a failure may occur in a supply, or a component may malfunction during a sequence, spoiling the successful welding and requiring shutting down the operation. The operator monitoring the weld is therefore provided with press button PB2 so that he may instantly arrest the electrode drive and disconnect all power supplies in an emergency.

Where the delay is of such length that the metal will have cooled, particularly after the "preheat" (arc dwell) stage, it is impossible to continue the weld with any expectation of satisfactory quality, hence the operator must remove the imperfect joint and prepare for a new welding cycle by bringing a prepared pair of butted tubing ends into the weld head, arranging internal line purge, and then pressing PB1, later PB5, as directed above.

Before the imperfect joint can be removed, it is necessary to bring the spool slot 47 into registering alignment with the housing slot 40 to enable the tubing to be removed, the required rotation being effected using the manual control provisions of the system. The operator presses "jog" button PB4, which will omit all welding and gas control operations, and which if held down will eventually restore the spool to the starting position.

It is possible, by pressing button PB5, to energize relays Z13, Z14 and Z15, initiating a sequence that corresponds to the sequence previously described under the heading "WELDING SEQUENCE — ARC INITIATION."

MOTOR INCHING

A desirable facility when troubleshooting and repairing, is provided by PB4, when pressed, which energizes Z12, closing 1-Z12 and energizing the speed control 179. If desired the running of the data-recording equipment may be prevented by switching it off internally to avoid drive starting as 2-Z12 closes. 3-Z12 disconnects from C3Z12, deenergizing LB1. At the moment when the slots 40 and 47 are aligned, button PB4 is released by the operator, whereupon the work may be unloaded and new work clamped in the head 20.

GENERAL CONSIDERATIONS

The quality of the weld made by the equipment depends on the correctness of a large number of factors and adjustments. Each phase of the weld current program requires to be exactly followed, once an optimum program has been determined for a specific material and size of tubing and wall thickness. The apparatus should be operated and adjusted so that no contamination of the work surface, or of the electrode surface, or of the gaseous filling of the weld chamber can occur in the cycle. All conditions that would adversely influence the arc must be excluded, such as high or varying magnetic fields, gas blow-through at any part of the joint, and damaged electrode. The effect of gas streaming initially out of the tubing under line purge pressure into the weld chamber may be minimized by careful end preparation. The electrode is made replaceable, and a preventive program of replacement at every 50 welds or less may be practiced. Supervision of cable layouts, and design of the welding unit to avoid magnetic fields and steel or nickel components are required to minimize magnetic influences.

Where the work is of crucial importance, the use of data-recording equipment is essential, with identification of each weld to permit correlation and inspection with chart traces. It is however feasible to obtain reproducible excellent welds by observing all precautions indicated, if the operator is alert to abnormal behavior. Two useful provisions toward this end are, the construction of the gas diffuser body 104 of transparent plastic material, through which the light emitted by the arc will be visible, enabling the operator to judge by its steadiness or erratic behavior how well the current is controlled. Such observation, when coupled with visual monitoring of the current meter provided at the pendant box 13, will immediately inform the operator of probable excellence or defectiveness of any weld. As an additional feature, the sound of the arc will be highly characteristic at each phase, providing an experienced operator with most useful information for judging probable weld quality.

While in the foregoing discussion the welding of a stainless steel alloy has been particularly discussed, other metals may be similarly satisfactorily welded by the method and apparatus of this invention. For each kind of metal and wall thickness, the current program may be found empirically by making trial welds with approximated program parameters, followed by visual and physical checking of the results, especially when chart recording equipment is employed, and metallurgical tests are carried out. The apparatus requires only the manual actuation of mode switch SM to manual mode, and program selector switch SJ to be stepped in synchronization with phase transitions. Each of the tapping points 190A through 190E will be adjusted for each trial, refining the program until an optimum program has been determined. Switch SJ, which during empirical trials was selectively moved in turn to contact the points 198 through 202, is thereafter ignored when SM is returned to automatic mode position, on contact 175, as proof trials are carried out with wholly automatic control.

The foregoing description, which is exemplary and not intended to be in any way limiting, provides a teaching of method and apparatus which those skilled in the art will recognize may be varied in many ways, without departing from the broad scope of the invention, as defined in and by the appended claims.

We claim:

1. The method of fusion joining metal tubing which comprises aligning end portions of a pair of tubing lengths with their ends abutting and holding said portions as a column in a manner to impose restraint to axial elongation of said column and with the end faces of the abutting ends contiguous, exposing a localized area at the junction of said faces to heating to a fusion temperature by means of a stationary arc in an inert atmosphere to form a weld puddle spanning the junction, said heating being at a rate and for a time effective to induce axial compression by temperature increase of said column thereafter advancing said localized area of heating at a uniform rate along the entire periphery of the junction while maintaining substantially constant weld puddle fluidity sufficient to effect fusion bonding of said end faces, discontinuing said arc, and maintaining said axial restraint during cooling of the weld to form an inseparable joint.

2. The method of claim 1 wherein the localized area is advanced through an arcuate distance greater than 360° but less than about 480°.

3. The method of claim 2 wherein the arc is established between a refractory metal electrode and the work.

4. The method of claim 3 wherein the electrode is moved in a path defining a plane at an adjustable uniform rate of travel and the locus of said path is traced a constant radial distance from the tubing surfaces.

5. The method of claim 4 wherein said end portions are filled with inert gas before welding and a predetermined gas pressure is maintained therein slightly above atmospheric during welding and solidification of the weld.

6. The method of claim 4 wherein during formation of said weld puddle the arc current is maintained at a constant value while the electrode is held stationary and thereafter while the electrode is rotating the current is reduced and held at a second steady value over a first arcuate interval extending along about 190° of said periphery, then reduced and held at a third steady value over a second arcuate interval extending along about 90° of said periphery, then reduced and held at a fourth steady value over a third arcuate interval extending along about 90° of said periphery, then tapered to a predetermined minimum value over a fourth arcuate interval extending along about 60° of said periphery and finally abruptly reduced to zero.

7. The method of claim 6 wherein the electrode is caused to move an arcuate distance of about 15 degrees from the initial weld puddle position before said second current level is maintained.

8. The method of claim 6 wherein the current level transitions following the terminations of said first, second, third and fourth values of constant current are gradual.

9. The method of fusion joining lengths of metal tubing which comprises aligning end portions of respective lengths and holding said aligned portions coaxial with their ends abutting to form a junction of their end faces, filling said end portions with inert gas and maintaining a predetermined gas pressure therein slightly above atmospheric, initiating a stationary electric arc between the junction and a refractory metal electrode in an inert gas atmosphere and maintaining arc current at a constant initial value and for a time sufficient to form a weld puddle spanning said junction and sufficient to effect a predetermined temperature rise of said end portions while holding said end portions restrained at areas spaced from said junction in contact with a massive electrically conductive and heat-conductive sink to chill the ends of said column and limit maximum temperature rise therealong, thereafter advancing the arc at a uniform rate about the junction to effect fusion bonding throughout the entire area of said end faces while controlling the arc current to maintain a viscosity of the weld puddle limiting radial distention of the puddle metal to a substantially constant amount offsetting weld shrinkage on cooling, and, while maintaining said axial restrain and predetermined internal gas pressure, cooling the weld bead in inert atmosphere to form an inseparable joint.

10. The method of claim 9 wherein the viscosity of the weld puddle is maintained at a constant value by controlling arc current to predetermined constant values over specific arcuate intervals of the periphery and wherein the arc is advanced through a peripheral distance greater than 360° but less than about 480°.

11. The method of claim 10 wherein said arc current is progressively reduced through five levels correlated with respective arcuate intervals of arc advance, commencing with said initial value over a first interval of about 15°, a second value over a second interval spanning about 190°, a third value over a third interval spanning about 90°, a fourth value over a fourth interval spanning about 90°, and a final value continuously decreasing from said fourth value over a fifth interval spanning about 60° to a predetermined minimum value, becoming zero thereafter.

12. The method of realizing a program of decreasing welding current levels for an automatic programmed TIG welding system for fusion bonding aligned lengths of metal tubing of a specific size, wall thickness, and kind of material by means of an electric arc passed between a revoluble refractory electrode and the work, comprising selecting a trial schedule of program integers including:
  1. a rate of arc translation along the tubing periphery;
  2. a preheating current time interval;
  3. a preheat current value;
  4. an arcuate interval of 15° while electrode is advancing from end of interval in 2 maintaining value of 3;
  5. a main weld current value;
  6. An arcuate interval about 180° maintaining level 5;
  7. a first decreased current value;
  8. an arcuate interval about 90° maintaining value of 7;
  9. a second decreased current value;
  10. an arcuate interval about 90° maintaining level 9;
  11. a final arcuate interval about 50° steadily decreasing current from level 9 to about 3 amperes at ending;

holding specimen lengths of said tubing coaxially in welding position with ends abutting defining a junction of the abutting end faces and correlating specimen position with the starting point; initiating an arc and effecting a first trial automatic welding sequence commencing at the initial value 3 for the interval in 2 and carrying out the remaining trial program; cooling the resulting welded joint; testing the weld, and revising the heat input by varying program integers to correct welding flaws, and repeating the trials with similar specimens using improved program values and subsequent testing to arrive at an optimum program for repetitive automatic welding of said tubing.

13. The method of claim 12 including the step of recording angular displacement intervals and current values as graphic traces on moving charts.

* * * * *